United States Patent [19]

Chang

[11] Patent Number: 5,100,735
[45] Date of Patent: Mar. 31, 1992

[54] WATERBORNE BASECOAT/HIGH SOLIDS CLEAR FINISH FOR AUTOMOTIVE SUBSTRATES HAVING AN IMPROVED APPEARANCE

[75] Inventor: David C. K. Chang, Birmingham, Mich.

[73] Assignee: E. I. Du Pont de Nemours and Company, Wilmington, Del.

[21] Appl. No.: 557,084

[22] Filed: Jul. 25, 1990

[51] Int. Cl.$^5$ .............................. B32B 27/08
[52] U.S. Cl. .................................. 428/515; 428/335; 428/402; 428/461; 428/502; 428/520; 428/522; 427/407.1; 427/409
[58] Field of Search ............... 428/335, 402, 457, 500, 428/463, 502, 520, 522, 461, 515; 427/407.1, 409

[56] References Cited

U.S. PATENT DOCUMENTS

| | | | |
|---|---|---|---|
| 4,166,882 | 9/1979 | Das et al. | 428/463 |
| 4,177,178 | 10/1979 | Das et al. | 428/463 |
| 4,189,518 | 2/1980 | Peterson | 428/458 |
| 4,264,656 | 4/1981 | Reeder | 427/385.5 |
| 4,271,062 | 6/1981 | Boomgaard et al. | 260/39 P |
| 4,375,498 | 3/1983 | Le Minez et al. | 428/416 |
| 4,384,103 | 5/1983 | Chattha | 528/83 |
| 4,397,989 | 8/1983 | Adesko | 525/162 |
| 4,413,111 | 11/1983 | Markusch et al. | 528/59 |
| 4,455,331 | 6/1984 | Barsotti | 428/446 |
| 4,495,335 | 1/1985 | Geist et al. | 525/438 |
| 4,530,957 | 6/1985 | Theodore et al. | 524/504 |
| 4,547,409 | 10/1985 | Geist et al. | 427/386 |
| 4,558,090 | 12/1985 | Trexler et al. | 524/591 |
| 4,650,718 | 3/1987 | Simpson et al. | 428/413 |
| 4,719,132 | 1/1988 | Porter, Jr. | 427/409 |
| 4,731,290 | 4/1988 | Chang | 428/335 |

FOREIGN PATENT DOCUMENTS

| | | |
|---|---|---|
| 0238037 | 9/1987 | European Pat. Off. . |
| 0243992 | 11/1987 | European Pat. Off. . |
| 0269059 | 6/1988 | European Pat. Off. . |
| 3312814 | 10/1984 | Fed. Rep. of Germany . |
| 61-179267 | 8/1986 | Japan . |
| 62-247865 | of 1988 | Japan . |
| 2074578 | 11/1981 | United Kingdom . |

*Primary Examiner*—Merrell C. Cashion, Jr.
*Assistant Examiner*—Hoa T. Le
*Attorney, Agent, or Firm*—Hilmar L. Fricke

[57] ABSTRACT

An improved process for forming a multilayer finish on a substrate by applying a layer of a waterborne basecoating composition to the substrate, at least partially drying the coating, applying a layer of a solvent based high solids clear coating to the basecoating and curing the coatings; the improvement that is used therewith is as follows:

A. a waterborne basecoating composition that has a film forming binder of an acrylic polymer neutralized with ammonia, a primary amine or a secondary amine without the presence of a tertiary amine a water dispersible or water dilutable alkylated melamine formaldehyde resin and the composition contains pigments in a pigment to binder weight ratio of about 0.5/100 to 200/100;

B. a high solids solvent based clear coating composition having a film forming binder of an acrylic polymer, a polyester or a polyesterurethane and an alkylated melamine formaldehyde crosslinking agent and about 0.1-5% by weight, based on the weight of the binder, of a strong acid catalyst;

wherein the basecoating composition and the clear coating composition are cured at about 100°-180° C. to form a glossy wrinkle free finish having an automotive quality appearance.

10 Claims, No Drawings

WATERBORNE BASECOAT/HIGH SOLIDS CLEAR FINISH FOR AUTOMOTIVE SUBSTRATES HAVING AN IMPROVED APPEARANCE

BACKGROUND OF THE INVENTION

This invention is related to a basecoat/clear coat for automotive substrates having an improved appearance.

Basecoat/clear coat finishes for automotive substrates are well known as shown by Benefiel et al U.S. Pat. No. 3,639,147 issued Feb. 1, 1972. Solvent based basecoat and clear coatings were used to form these finishes. To comply with current air quality standards, a waterborne basecoat coating composition is being used in combination with, a high solid solvent based clear coating composition. These coating are usually applied "wet on wet" with only a short period of drying of the waterborne basecoat before application of the solvent based clear coat. Chang U.S. Pat. No. 4,731,290 issued Mar.15, 1988 illustrates such basecoat/clear coat finishes.

However, with certain waterborne basecoats and solvent based clear coats minor to sever wrinkling of the resulting finish has occurred which previously had not been a problem when both coats were solvent based. This invention provides for a waterborne base coating and high solids solvent based clear coating that does not wrinkle on curing and provides a finish that has an excellent appearance.

SUMMARY OF THE INVENTION

An improved process for forming a multilayer finish having an automotive quality appearance after curing by applying a layer of a waterborne basecoating composition to the substrate, at least partially drying the coating, applying a solvent based high solid clear coating to the basecoating and curing both of the coatings; the improvement that is used therewith is as follows:

A. the waterborne basecoating composition contains a film forming binder of about 60-97% by weight, based on the weight of the binder, of an acrylic polymer neutralized with ammonia, a primary amine or a secondary amine without the presence of a tertiary amine and 3-40% by weight based on the weight of the binder, of a water dispersible or water dilutable alkylated melamine formaldehyde resin and contains pigments in a pigment to binder weight ratio of about 0.5/100 to 200/100;

B. the high solids solvent based clear coating composition contains film forming binder of about 50-95% by weight of an acrylic polymer, a polyester or a polyesterurethane and 5-50% by weight of an alkylated melamine formaldehyde crosslinking agent and about 0.1-5% by weight, based on the weight of the binder, of a strong acid catalyst;

wherein the basecoating composition and the clear coating composition after being applied to the substrate are cured at about 100°-180° C. to form a glossy wrinkle free finish.

DETAILED DESCRIPTION OF THE INVENTION

The improved process of this invention provides a finish of a waterborne basecoat and a solvent based high solids clear coat that has excellent gloss, that meets automotive and truck quality standards and that is free from imperfections such as wrinkling. This is accomplished by using a waterborne coating composition in which the film forming acrylic polymer of the binder is neutralized with ammonia, a primary amine or a secondary amine or a mixture of a primary and secondary amine. This waterborne composition is used in combination with a high solids clear coating composition that contains a strong acid catalyst. It has been found that when a tertiary amine is used in the waterborne composition, wrinkling and deformation of the resulting finish in particular the clear finish occurs on curing.

The waterborne basecoating composition used herein has a film forming binder of about 60-97% by weight of an acrylic polymer, preferably a latex and 3-40% by weight of an alkylated melamine formaldehyde resin which is dilutable or dispersible in water.

The acrylic polymer is prepared by a conventional polymerization process to form a latex of high molecular weight acrylic polymer. The latex is prepared by emulsion polymerization in which monomers, catalyst such as ammonium persulfate, water, surfactants and a neutralizing agent such as ammonia or a primary or secondary amine are utilized. The polymerization is carried out under conventional temperatures of about 50°-90° C. for about 1-5 hours. Typically the acrylic polymer has high weight average molecular weight of about 500,000-3,000,000 and a particle size of about 0.06-0.20 microns.

The monomers used to form the acrylic latex are alkyl acrylates, alkyl methacrylates each having 1-12 carbon atoms in the alkyl group, hydroxy alkyl acrylates or methacrylates having 1-4 carbon atoms in the alkyl groups and ethylenically unsaturated carboxylic acid. Up to about 20% by weight of styrene also can be used.

Typical alkyl acrylates and methacrylates that can be used are methyl acrylate, ethyl acrylate, propyl acrylate, isopropyl acrylate, butyl acrylate, isobutyl acrylate, pentyl acrylate, hexyl acrylate, octyl acrylate, nonyl acrylate, lauryl acrylate, methyl methacrylate, ethyl methacrylate, propyl methacrylate, butyl methacrylate, isobutyl methacrylate, hexyl methacrylate, octyl methacrylate, nonyl methacrylate, lauryl methacrylate and the like.

Typical hydroxy alkyl acrylate and methacrylates that can be used are hydroxy methyl acrylate, hydroxy ethyl acrylate, hydroxy propyl acrylate, hydroxy butyl acrylate, hydroxy methyl methacrylate, hydroxy ethyl methacrylate, hydroxy propyl methacrylate, hydroxy butyl methacrylate and the like.

Typical ethylenically unsaturated carboxylic acid that can be used are acrylic acid, methacrylic acid, itaconic acid, maleic acid and the like.

Preferably, the acrylic polymer of the latex contains an alkyl methacrylate having 1-4 carbon atoms in the alkyl group, an alkyl acrylate having 2-8 carbon atoms in the alkyl group, a hydroxy alkyl acrylate or methacrylate having 2-4 carbon atoms in the alkyl group and methacrylic acid or acrylic acid.

One particularly preferred latex contains an acrylic polymer of about 10-20% by weight methyl methacrylate, 70-80% by weight butyl acrylate, 2-9% by weight hydroxy ethyl acrylate and 1-5% by weight methacrylic acid.

The acrylic polymer of the latex is neutralized with ammonia, a primary amine or a secondary amine. Typically useful primary amines are aminoethyl propanol, allylamine, 1-amino-2-propanol, 3-amino-1-propanol, benzylamine, butylamine, sec. butylamine, tert. butylamine, cyclohexylamine, decylamine, dodecylamine, ethanolamine, ethylamine, 2-ethylhexylamine, heptylamine, hexylamine, isobutylamine, isopropylamine, methylamine, octylamine, pentylamine, propylamine, ethylene diamine and the like. Typically useful secondary amines are 2,2-dimethyl oxaolidine-1,4, 2,2-dimethanol oxazolidine-1,4, 2-methyl 1-2-methanol oxazolidine -1,4, 2,2-diethyl oxazolidine-1,4, dibenzyl amine, dibutylamine, dicyclohexylamine, didodecylamine, diethanolamine, diethylamine, 2,2-diethylhexylamine, dihexylamine, disopropanolamine, dimethyl amine, dioctylamine, dipentylamine, dipropylamine, 2-ethyl amino ethanol, 2(2-hydroxyethylamino)-2-(hydroxymethyl)-1, 3-propanediol, 2-methyl aminoethanol, 2,(2-amino ethylamino) ethanol, 3,3 diamino-dipropylamine, diethylene triamine, N-methyl ethylene diamine the like.

The waterborne basecoat contains about 5-40% by weight of a water dispersible or water dilutable alkylated melamine formaldehyde crosslinking agent. One preferred composition contains about 5-30% by weight of the crosslinking agent and 70-95% by weight of the acrylic polymer.

Typical monomeric and polymeric alkylated melamine formaldehyde crosslinking agents that can be used are partially or fully alkylated melamine formaldehyde resins, such as "Cymel" 300 resins. Particularly useful resins are partially or highly methylated melamine formaldehyde resins, mixed ether and butylated melamine formaldehyde resins and other partially or fully alkylated melamine formaldehyde resins having 1-6 carbon atoms in the alkyl group. One preferred resin is "Cymel"325 which is a methylated melamine formaldehyde resin that has a methoxymethylimino functionality. Another preferred resin is "Cymel" 300 which is a highly methylated melamine formaldehyde resin containing reactive alkoxy groups.

The basecoating composition contains pigments in a pigment to binder weight ratio of about 0.5/100-200/100. Typical pigments that can be used are metallic oxides such as titanium dioxide, zinc oxide, iron oxides of various colors, metallic flake pigments such as aluminum flake pigments, filler pigments such as barytes, talc, magnesium silicate, silica, colloidal silica, carbon black, organic pigments such phthalocyanine greens and blues, perylenes, azo pigments, indanthrone blues, carbazoles such as carbazole violet, isoindolones, thioindigo reds, benzimidazolinones and the like. The pigments are formulated into a mill base using conventional procedures and then the mill base is blended with the acrylic polymer latex and the crosslinking agent to form the basecoating composition.

The basecoating composition can contain about 0.1-5% by weight, based on the weight of the binder, of ultraviolet light stabilizers which include ultraviolet light absorbers, screeners and quenchers. Typical ultraviolet light stabilizers include benzophenones, triazines, triazoles, benzoates, hindered amines and mixtures thereof.

Thickeners and rheology control agents can be added to the basecoating composition in amounts of about 0.5-5% by weight, based on the weight of the binder, to provide the desired spray viscosity and rheology. Typically, acrylic polymers such as polyacrylic acid, clays such "Bentones", cellulosics or urethanes can be added.

The substrates over which the basecoating composition is applied are those conventionally used for automotive and truck bodies such as cold roll steel, phosphatized steel, polyester reinforced fiber glass, reaction injection molded urethane, crystalline amorphous polyamides and the like. Typically, these substrates are coated with a pigmented layer of an alkyd resin primer, polyester primer, epoxy resin primer and the like.

The basecoating composition can be applied to a substrate by any of the conventional methods such as spraying, electrostatic spraying, dipping, brushing, flow coating and the like. The preferred method is spraying After application the composition is usually dried at ambient temperatures or at an elevated temperature of 30°-100° C. for about 0.5-30 minutes to allow water and solvent to evaporate before the clear coating is applied. Generally, the basecoating is applied to provide a dry film thickness of about 0.2-2.0 mils in thickness.

The high solids solvent based clear coating composition has as the film forming binder about 50-97% by weight of either an acrylic polymer, a polyester or a polyesterurethane and 3-50% by weight of an alkylated melamine formaldehyde crosslinking agent. The composition also contains about 0.1-5% by weight of a strong acid catalyst.

The acrylic polymer used in the clear coating is prepared by conventional solution polymerization techniques well known in the art wherein monomers, solvents and catalyst are reacted for about 1-5 hours at about 50°-150° C. to form a polymer solution.

Acrylic polymers or blends of acrylic polymers are used to form the clear coat composition. One useful acrylic polymer is the polymerization product of alkyl methacrylate having 1-4 carbon atoms in the alkyl group, an alkyl acrylate having 2-8 carbon atoms in the alkyl group and a hydroxy alkyl acrylate or methacrylate. These acrylic polymers may contain 1-40% by weight styrene. Any of the aforementioned alkyl acrylate and methacrylate monomers and hydroxy alkyl acrylate and methacrylate monomers may be used to form the acrylic polymer. Typically useful acrylic polymer have a weight average molecular weight of about 5,000-20,000.

Typical polyesters that can be used to form the clear coating composition are the condensation -reaction product of a polyol such as pentaerythritol, a glycol, a monocarboxylic acid, an aromatic and an aliphatic dicarboxylic acid. It has been found that the incorporation of a glycol a pentaerythritol into the polyester imparts the desired hardness and durability to the final cured film. Any branched-chain glycols are usable in the formation of this polyester, although it is preferred that these glycols contain no more than 8 carbon atoms. Neopentyl glycol and pinacol are examples of preferred branched-chain glycols. A particularly useful polyol is formed when the molar ratio of glycol to pentaerythritol is from 2:1 to about 6:1. A ratio 3:1 to 4.5:1 is preferred.

The monocarboxylic acid component of the polyester polyol is present primarily to prevent molecular weight build-up of the polyol. It has been found that any aromatic or saturated aliphatic monocarboxylic acid, or mixtures of these, having 18 or fewer carbon atoms can be used. Normally, this acid will be used in a molar ratio of acid to pentaerythritol of about 1:1 to 2.5:1.

Examples of preferred aromatic monocarboxylic acids are benzoic acid, parateritary butylbenzoic acid, triethyl benzoic acid, toluic acid, phenylacetic acid, and the like. Examples of preferred aliphatic acids are acetic acid, propionic acid, butyric acid, capric acid, lauric acid, myristic acid, palmitic acid, stearic acid, or mixtures of these. Branched-chain aliphatic monocarboxylic acids can also be used. Most preferred are benzoic acid, lauric acid, and pelargonic acid.

The dicarboxylic acids useful in the formation of the polyester have the general formula

where R is saturated aliphatic or aromatic group.

Preferred acids when R is aliphatic are those in which R has 2-10 carbon atoms. Most preferred of these are succinic acid. The aromatic dibasic acids that are preferred are phthalic, iso-phthalic, terephthalic, uritic, and cumidinic acids, although other aromatic dibasic acids could also be used.

Mixtures of these aromatic and aliphatic dicarboxylic acids can also be used. Nevertheless, whether mixtures of each kind of acid are used or whether only one of each kind of acid is used, the molar ratio of aromatic diacids to aliphatic diacids should have a range of about 2:1 to 6:1. A ratio of about 3:1 is preferred. It is to be further understood that the lower alkyl mono-or diesters of these acids and the anhydrides, where applicable of these acids can also be used in place of the acids themselves with equivalent results. If the above-mentioned esters are used, the alkyl groups preferably have no more than 5 carbon atoms.

The polyester can typically be formed by charging the reactants and a suitable solvent into a reaction vessel. The reaction mixture is then heated to its reflux temperature, usually about 100° C.-300° C., and there maintained for a period of 1-8 hours. During this period the water of esterification is withdrawn. The reaction product, the polyester polyol, should have a number average molecular weight (determined by gel permeation chromatography based on polystyrene standards) of 150-1000, referably 250-450. The reactants should be chosen also so that the polyester has a hydroxyl content of 5-9% by weight, preferably 7-8% by weight.

Typical polyesterurethanes that can be used to form the clear coating composition are typically prepared by the reaction of a diol and an isocyanate.

Diols which can be used include polycaprolactone diol, as well as a wide variety of hydroxyl terminated polyesters made from polybasic acids and polyols. Polybasic acids which can be used include aliphatic cycloaliphatic, aromatic and/or heterocyclic acids and they can be substituted, e.g. by halogen atoms, and/or unsaturated. Representative examples include succinic acid, adipic acid, superbic acid, azelaic acid; sebacic acid, phthalic acid; isophthalic acid anhydride; tetrahydrophthalic acid anhydride, hexahydrophthalic acid anhydride, tetrachlorophthalic acid anhydride; glutaric acid anhydride, maleic acid, maleic acid anhydride, fumaric acid, dimeric and trimeric fatty acids such as oleic acid, which may be mixed with monomeric fatty acids; dimethyl terephthalate and bisglycolterephthalate.

Polyhydric alcohols which can be used include ethylene glycol, propylene glycol (1,2) and (1,3), butylene glycol (1,4) and (1,3), hexanediol (1,6), octanediol (1,8), neopentyl glycol, cyclohexanedimethanol (1,4-bis-hydroxymethylcyclohexane), 2-methyl-1,3-propanediol, glycerol, trimethylol-propane, hexanetriol (1,2,6) butanetriol (1,2,4) trimethylolethane, triethylene glycol, tetraethylene glycol, polyethylene glycol, dipropylene glycol, polypropylene glycol, dibutylene glycol and polybutylene glycol. The polyesters can also contain a proportion of carboxyl end groups. Polyester of lactones, e.g. caprolactam, or hydroxycarboxylic acids, e.g. hydroxycaproic acid, can also be used.

The preparation of the OH-terminated polymers can be carried out in the presence of organic solvents which are commonly used in polyurethane coating compositions and include esters, ketones, halogenated hydrocarbons, alkanes, alkenes, and arenes. Preferred solvents are toluene, xylene, butyl acetate, methyl isobutyl ketone, ethyl acetate, ethylene glycol monobutyl ether acetate, ethylene glycol monoethyl ether acetate, ethylene glycol monomethyl ether acetate, isobutyl isobutyrate, methyl ethyl ketone and mineral spirits.

The amount of solvent may vary within wide limits, but is generally maintained below about 80% by weight, preferably below about 50% by weight, based on the weight of the OH-terminated prepolymers.

The acids and polyols are charged to a reactor with a small amount of solvent, generally about 5% of the weight of acids and polyol. The water of esterification can be removed by azeotropic distillation at temperatures of about from 160° C. to 245° C. The water removal is generally carried on until an acid number of less than 10 is reached. The batch is reduced to the desired solids with an appropriate solvent.

Isocyanates which can be used in the preparation of the polyester-urethane include methylene bis(cyclohexyl isocyanate) isophorone di-isocyanate, hexylmethylene diisocyanate, trimethyl hexamethylene diisocyanate and toluene diisocyanate.

In the preparation of the polyester urethane, a slight molar excess of the diol is used in the reaction, preferably in combination with about from 0.05 to 0.15 moles of a source of carboxyl groups such as 2,2-bis(hydroxymethyl) propionic acid.

The basic components of the polyester urethane are brought together in a solvent such as ethylacetate, and xylene, together with a catalyst such as dibutyl tin dilaurate, and dibutyl tin oxide. The reaction is typically carried out at elevated temperatures of about from 100° C. to 150° C., a range of about from 120° C. to 130° C. having been found to be particularly satisfactory.

Particularly satisfactory polyesterurethanes are those prepared from the components described in U.S. Pat. No. 4,413,111, hereby incorporated by reference.

The alkylated melamine formaldehyde crosslinking agent that can be used in the clear coating are very similar to those described above except that the crosslinking agent need not be water dispersible or water soluble. Usually, fully alkylated melamine formaldehyde crosslinking agent are used such as methylated and butylated melamine formaldehyde resins. One preferred crosslinking agent is "Resimene" 755.

The clear coating composition preferably contains a rheology control package of colloidal silica and polyvinyl pyrrolidone as disclosed in Barsotti U.S. Pat. No. 4,455,331 issued June 19, 1984 which is hereby incorporated by reference. Typically about 1-10% by weight, based on the weight of the binder, of colloidal silica and about 0.1-10% by weight, based on the weight of the binder, of polyvinyl pyrrolidone are used.

The clear coating can also contain about 0.1-5% by weight, based on the weight of the binder, of ultraviolet light stabilizers which have been disclosed above.

Small amounts of film fortifiers and transparent pigments or pigments that change the tint of the clear such as to eliminate a yellow tint in the clear can be added.

The clear contains an strong acid catalyst in amounts of about 0.1-5% by weight based on the weight of the binder. Typical strong acid catalysts that can be used are sulfonic acid, para-toluene sulfonic acid, alkyl benzene sulfonic acids such as dodecyl benzene sulfonic acid, phosphoric acid, alkyl acid phosphates, in which the alkyl group has 1-12 carbon atoms and the like.

Adducts of the aforementioned acids also can be used such as epoxy resins reacted with phosphoric acid or sulfonic acid or compounds such as alkyl oxazolidines such as dimethyl oxazolidine reacted with these acids.

The acid constituents in the clear composition may be neutralized with an amine. Only primary or secondary amine may be used. If a tertiary amine is introduced wrinkling of the finish on curing may result.

The clear coating composition is applied to the basecoating by any of the aforementioned methods. Spraying and electrostatic spraying are preferred The substrate coated with the basecoating and clear coating is then baked at about 100°-180° C. for about 1-30 minutes to provide a glossy wrinkle free finish with automotive quality appearance that is about 0.5-6.0 mils in thickness.

The following example illustrates the invention. All parts and percentages are on a weight basis. Molecular weights are weight average and determined by gel permeation chromotagrpahy.

EXAMPLE

Four latices A-D were prepared and formulated into a waterborne basecoat and each were coated onto a separate substrate and each topcoated with a high solids solvent based clear coating composition catalyzed with a strong acid catalyst and cured by baking to form a base coat/clear coat finish. The finishes of coating compositions made with latices A and B which were neutralized with primary and secondary amine respectively had excellent gloss and a good appearance and did not wrinkle while the finishes formed with latices C and D which were each neutralized with tertiary amines formed finishes on curing that wrinkled and did not have an acceptable appearance and gloss.

Latex A was prepared by charging the following constituents into a polymerization vessel equipped with a stirrer and a heating source:

|  | Parts by Weight |
|---|---|
| Portion 1 |  |
| Deionized water | 2535.0 |
| Anionic surfactant | 16.4 |
| (Alkyl phenol ethylene oxide) |  |
| Portion 2 |  |
| Anionic surfactant (described above) | 23.4 |
| Methyl methacrylate monomer | 369.0 |
| Butyl methacrylate monomer | 1622.4 |
| Deionized water | 2335.0 |
| Portion 3 |  |
| Deionized water | 225.0 |
| Ammonium Persulfate | 7.0 |
| Portion 4 |  |
| Deionized water | 1097.0 |
| Anionic surfactant (described above) | 11.7 |
| Methacrylic acid | 81.7 |
| Hydroxy ethyl acrylate monomer | 116.8 |
| Butyl acrylate monomer | 385.3 |
| Portion 5 |  |
| Deionized water | 85.0 |
| Ammonium Persulfate | 2.3 |
| Portion 6 |  |

|  | Parts by Weight |
|---|---|
| Deionized water | 451.0 |
| Amino methyl propanol | 60.7 |
| "Cosan" 145 - latex preservative of an oxazolidine derivative made by Cosan Chemical Corp. | 10.0 |
| TOTAL | 9434.6 |

Portion 1 is charged into the polymerization vessel and heated to about 83° C. Portion 2 is premixed. About 10% of Portion 2 is added and the resulting reaction mixture is held at the above temperature. The remainder of Portion 2 is added over a 60 minute period along with about 72% of Portion 3 while controlling the reaction mixture at about 85° C. The remainder of Portion 3 along with Portion 4 is added over a 30 minute period while controlling the reaction mixture at 85° C. Portion 5 is added and the reaction mixture is held at 85° C. for 60 minutes. Portion 6 is added over a 30 minute period and held at the above temperature for about 1 hour. The resulting latex is cooled to room temperature and filtered.

The latex has a polymer solids content of 27.7% and a pH of 7.2. The polymer is comprised of 14.3% methyl methacrylate, 78.0% butyl acrylate, 3.2% methacrylic acid, and 4.5% hydroxy ethyl acrylate.

Latices B-D were formulated using the same constituents as above except as follows: for latex B an equal molar amount of 2,2-dimethyl oxazolidine-1,4 which is a secondary amine was substituted for the amino methyl propanol; for latex C an equal molar amount of dimethyl ethanol amine which is a tertiary amine was substituted for the amino methyl propanol; and for latex D an equal molar amount of triethyl amine was substituted for the amino methyl propanol.

An aluminum mill base was prepared as follows:

|  | Parts by Weight |
|---|---|
| Ethylene glycol monobutyl ether | 55.13 |
| Polyoxyethylene ester of mixed fatty acids and resins | 4.87 |
| Aluminum flake paste (65% solids in mineral spirits) | 40.00 |
| Total | 100.00 | the above constituents were charged into a mixing vessel and thoroughly mixed together.

The following waterborne basecoating compositions were formulated by blending together the following constituents:

| Coating Composition | 1 | 2 | 3 | 4 |
|---|---|---|---|---|
| Latex A | 1557 |  |  |  |
| Latex B |  | 1557 |  |  |
| Latex C |  |  | 1557 |  |
| Latex D |  |  |  | 1557 |
| Deionized water | 1029 | 1029 | 1029 | 1029 |
| "Cymel" 325* | 104 | 104 | 104 | 104 |
| Aluminum mill base (prepared above) | 331 | 331 | 331 | 331 |
| "Acrysol" ASE 60 (acrylic latex thickener) | 200 | 143 | 227 | 200 |
| Amino methyl propanol | 23.4 |  |  |  |
| Dimethyl oxazolidine |  | 23.4 |  |  |
| Dimethyl ethanol amine |  |  | 23.4 |  |

-continued

| Coating Composition | 1 | 2 | 3 | 4 |
|---|---|---|---|---|
| Triethyl amine | | | | 23.4 |
| Deionized water | 2700 | 1407 | 4123 | 2494 |
| pH | 7.7 | 7.7 | 7.6 | 7.6 |
| Brookfield Viscosity | | | | |
| #3 5 RPM (cps) | 2660 | 2700 | 2940 | 2900 |
| #3 50 RPM (cps) | 173 | 182 | 189 | 199 |
| ICI cone & plate viscometer (poise) | 0.51 | 0.45 | 0.80 | 0.75 |

*Melamine resin solution - 80% solids in isobutanol of a highly methylated melamine formaldehyde resin having a low methylol content and containing alkoxy imino groups)

A high solid solvent based clear coating composition was prepared by blending together the following ingredients:

| | Parts by Weight |
|---|---|
| Siloxane solution (5% solids of oxyphenylene methyl siloxane in xylene) | 0.20 |
| Inhibitor solution (.05 parts "Irganox" 1010, .99 parts "Tinuvin" 900 and 8.87 parts xylene) | 9.90 |
| Xylene | 3.02 |
| Acrylic polymer solution (1.75 parts styrene/methyl methacrylate/hydroxy ethyl acrylate polymer weight ratio 15/15/40/30, 0.83 parts methyl amyl ketone and 0.74 parts of film fortifier A-133D from Heubach) | 3.32 |
| Silica Dispersion (5.47 parts "Resimene" 755, 2.29 isopropanol, 2.29 parts methyl amyl ketone, 0.98 parts "Aerosil" 200 colloidal silica from Degussa) | 11.03 |
| "Resimene" 755 | 13.24 |
| Acrylic polymer solution 1 (20.47 parts of copolymer of butyl methacrylate/hydroxy propyl acrylate weight ave MW 7000 8.77 parts xylene) | 29.25 |
| Acrylic polymer solution 2 (7.39 parts of polymer of styrene/methyl methacrylate/butyl acrylate/hydroxy ethyl acrylate/acrylic acid in a weight ratio 29/21/32/17/1, 1.01 parts butyl acetate, 0.29 parts n-butanol, 1.97 parts ethylene glycol monoethyl ether acetate and 1.51 parts petroleum naphtha) | 12.18 |
| Methanol | 12.62 |
| N-propyl alcohol | 1.70 |
| PVP solution (0.13 parts polyvinyl pyrrolidone and 1.89 parts methanol) | 2.02 |
| Amine solution (0.06 parts n-propyl amine and 0.19 parts methanol) | 0.25 |
| N-butanol | 0.85 |
| Acid catalyst solution (0.29 parts dodecyl benzene sulfonic acid and 0.13 parts isopropanol) | 0.42 |
| Total | 100.00 |

The above prepared waterborne base coating compositions 1 through 4 were each spray applied to separate phosphatized steel panels; each panel was coated with an electordeposited epoxy ester electrocoating composition. Three coats were applied. In each case, the coating was held at room temperature for 10 minutes to allow solvent to flash from the coating and then the panels were baked for 10 minutes at about 83° C. The above prepared clear coating composition was reduced with xylene to a viscosity of 45" determined with a #2 Fischer cup. The clear coat was applied in two coats and was held at room temperature for 10 minutes to allow solvent to flash off and then baked for 30 minutes at 125° C. to provide a clear coating about 1.8-2.0 mils thick.

| Coating composition | 1 | 2 | 3 | 4 |
|---|---|---|---|---|
| Basecoat film thickness (mils) | 0.55 | 0.5 | 0.55 | 0.52 |
| Clear Coat film thickness (mils) | 2.0 | 2.1 | 1.9 | 1.9 |
| Gloss (measured at 20°) | 90 | 89 | 67 | 2 |
| Distinctness of Image | 61 | 59 | 30 | 0.7 |
| Appearance | ok | ok | slight wrinkle | severe wrinkle |
| Amine | primary | secondary | tertiary | tertiary |

Conclusion - primary and secondary amines can be used in a waterborne base coat with a high solids solvent based clear coating composition containing a strong acid catalyst and a melamine resin without causing wrinkling of the finish. Tertiary amines cannot be used in the base coat.

I claim:

1. An improved process for forming a multilayer finish by applying a layer of a waterborne basecoating composition to a substrate, at least partially drying the coating, applying a layer of a solvent based high solids clear coating to the basecoating and curing the coatings; the improvement used therewith consists essentially of using the following:

A. a waterborne basecoating composition comprising a film forming binder of about 60-97% by weight, based on the weight of the binder, of an acrylic polymer neutralized with ammonia, a primary amine or a secondary amine without the presence of a tertiary amine and 3-40% by weight based on the weight of the binder, of a water dispersible or water dilutable alkylated melamine formaldehyde resin and the composition contains pigments in a pigment to binder weight ratio of about 0.5/100 to 200/100;

B. a high solids solvent based clear coating composition comprising film forming binder of about 50-95% by weight of an acrylic polymer, a polyester or a polyesterurethane and 5-50% by weight of an alkylated melamine formaldehyde crosslinking agent and about 0.1-5% by weight, based on the weight of the binder, of a strong acid catalyst;

wherein the basecoating composition and the clear coating composition are cured at about 100°-180° C. to form a glossy wrinkle free finish having an automotive quality appearance.

2. The process of claim 1 in which the acrylic polymer of the waterborne basecoat consists essentially of an alkyl methacrylate, an alkyl acrylate each having 1-12 carbon atoms in the alkyl group, a hydroxy alkyl acrylate or methacrylate having 1-4 carbon atoms in the alkyl group, and an ethylenically unsaturated monocarboxylic acid and the alkylated melamine formaldehyde resin has 1-4 carbon atoms in the alkyl group.

3. The process of claim 2 in which the acrylic polymer contains up to 20% by weight styrene.

4. The process of claim 2 in which the acrylic polymer of the waterborne basecoat consists essentially of an alkyl methacrylate having 1-4 carbon atoms in the alkyl group, an alkyl acrylate having 2-8 carbon atoms in the alkyl group, a hydroxy alkyl acrylate or methacrylate each having 2-4 carbon atoms in the alkyl group and methacrylic acid or acrylic acid and the alkylated melamine formaldehyde is methylated and contains alkoxy immino groups.

5. The process of claim 1 in which the binder of the clear coating composition consists essentially of an acrylic polymer or blend of acrylic polymers comprising an alkyl methacrylate having 1-4 carbon atoms in the alkyl group, an alkyl acrylate having 2-8 carbon atoms in the alkyl group and a hydroxy alkyl acrylate or methacrylate having 1-4 carbon atoms in the alkyl group and composition contains about 0.1-5% by weight based on the weight of the binder of a sulfonic acid catalyst.

6. The process of claim 5 in which the acrylic polymer or blend of acrylic polymers of the clear coating composition contain up to 20% by weight polymerized styrene and optionally contain up to 5% by weight of polymerized ethylenically unsaturated acid monomers.

7. The process of claim 6 in which the clear coating composition contains 0.1-5% by weight, based on the weight of the binder, of ultraviolet light stabilizers, 1-10% by weight, based on the weight of the binder, of colloidal silica and 0.1-10% by weight of polyvinyl pyrrolidone.

8. The process of claim 1 in which the amine used in the waterborne basecoat is from the group of amino methyl propanol, propyl amine, butyl amine, ethanol amine, dodecylamine, diethanol amine, methyl ethanol amine, ethyl ethanol amine, 2,2-dimethyl oxazolindine-1,4, 2,2-dimethanol oxazolidine-1,4, 2-methyl-2-methanol oxazolidine-1,4 and 2,2 diethyl oxazolidine-1,4 and the acid catalyst, of the high solids clear coating is dodecyl benzene sulfonic acid.

9. A substrate coated according to the process of claim 1 having a 0.2-2 mil thick layer of the cured waterborne basecoat composition and a 0.5-6.0 mil thick layer of the cured clear solvent based composition.

10. The substrate of claim 9 in which the substrate is a metal having a layer of a primer coating.

* * * * *